United States Patent Office 3,066,114
Patented Nov. 27, 1962

3,066,114
NEW ADDITION POLYMERS FROM MONOMERIC VINYL COMPOUNDS AND UNSATURATED LINEAR POLYESTER RESINS AND A PROCESS FOR PREPARING THE SAME
Gustav Hägele, Wuppertal-Barmen, and Wilhelm Meyer and Friedrich Johannsen, Wuppertal-Elberfeld, Germany, assignors to Dr. Kurt Herberts & Co. vorm. Otto Louis Herberts, Wuppertal-Barmen, Germany
No Drawing. Filed Apr. 16, 1959, Ser. No. 806,776
Claims priority, application Germany Apr. 22, 1958
6 Claims. (Cl. 260—45.4)

This invention relates to new addition polymers from monomeric vinyl compounds and unsaturated linear polyester resins and to a process for preparing the same.

More particularly the invention relates to the new addition polymers of monomeric vinyl compounds and unsaturated linear polyester resins containing in their molecule the grouping

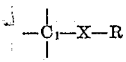

wherein $C_1$ represents a carbon atom of one of the glycol radicals of the polyester molecule, R represents a member of the group consisting of the endomethylene tetrahydrophenyl radical, the endomethylene hexahydrophenyl radical, the 1.4-methano-bicyclo-[4.3.0]-nonenyl-radical and the 1.4-methano-bicyclo-[4.3.0]-nonyl-radical and X represents an aliphatic radical containing in its chain 1–4 carbon atoms and 1 oxygen atom.

It is known to produce films and hardened moulded structures by addition polymerisation of monomeric vinyl compounds with unsaturated polyester resins. Styrene and homologues of styrene, such as vinyl toluene, are preferentially used as the monomeric vinyl compounds. The unsaturated linear polyester resins are prepared by reaction of saturated glycols with α,β-unsaturated dicarboxylic acids or their anhydrides, for example maleic acid anhydride or mixtures thereof with saturated dicarboxylic acids, for example phthalic acid anhydride. It is preferred to use mixtures of maleic acid anhydride and phthalic acid anhydride. Ethylene glycol or propylene glycol are for example used as glycols.

It has now been found that addition polymers which are lustrous and non-tacky when dry are obtained from monomeric vinyl compounds and unsaturated polyester resins if the starting products used for the production of the addition polymers are unsaturated linear polyester resins which contain endomethylene tetrahydrophenyl radicals, endomethylene hexahydrophenyl radicals, 1.4-methano-bicyclo-[4.3.0]-nonenyl-radicals and 1.4-methano-bicyclo-[4.3.0]-nonyl radicals in their molecule and are still sufficiently soluble in the monomeric vinyl compound. The endomethylene tetrahydrophenyl radical has the following Formula I and the 1.4-methano-bicyclo-[4.3.0]-nonenyl radical has the following Formula II;

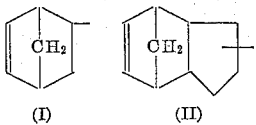

The endomethylene hexahydrophenyl radical and the 1.4-methano-bicyclo-[4.3.0]-nonyl radical are produced by hydrogenation of the radicals I and II, respectively.

The radicals of the aforementioned nature can be directly bonded to one of the carbon atoms of one of the glycol radicals of the polyester molecule. According to one preferred embodiment of the invention, the radicals in question are bonded to one of the carbon atoms of one of the glycol radicals of the polyester molecule by way of a chain containing 1 to 4 carbon atoms, which chain can be interrupted by an oxygen atom.

The said radicals are introduced into the unsaturated polyester resins in accordance with the invention by wholly or partially replacing the glycols normally used in the production of the unsaturated polyester resins by glycols which contain a radical of the aforementioned type. Suitable glycols of this type are for example obtained by addition of cyclopentadiene to unsaturated glycols such as glycerine monoallyl ether, by reaction of epichlorhydrin or glycerine with the addition compound of water and dicyclopentadiene with addition of boron fluoride and subsequent saponification, by hydrogenation of the aforesaid unsaturated addition products or by etherification of penaterythritol or trimethylol propane with the addition product of cyclopentadiene and allyl alcohol or crotyl alcohol or with dicyclopentadienyl alcohol or the hydrogenation product thereof. Such ethers can also be directly prepared from for example dicyclopentadiene and glycerine or pentaerythritol, even though in this case it may be necessary to separate the monoethers, diethers and triethers being formed at the same time.

When using the substituted glycols mentioned before addition polymers are obtainable which contain in their molecule the grouping

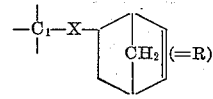

wherein $C_1$ represents a carbon atom of one of the glycol radicals of the polyester molecule and X represents an aliphatic radical containing in its chain 1–4 carbon atoms and 1 oxygen atom, or the grouping

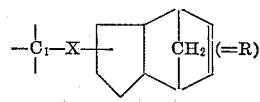

wherein $C_1$ represents a carbon atom of one of the glycol radicals of the polyester molecule and X represents an aliphatic radical containing in its chain 1–4 carbon atoms and 1 oxygen atom.

At least 20% of the usual glycols are to be replaced by the glycols substituted as mentioned before.

The condensation can be carried out in a manner known per se until an acid number of about 30 to 50 is reached.

The invention is further illustrated by the following examples:

Example 1

196 g. of maleic acid anhydride, 222 g. of glycerine mono-(tricyclodecenyl)-ether (obtainable by reacting epichlorhydrin with the addition compound of water and dicyclopentadiene) and 62 g. of ethylene glycol are esterified with the addition of 200 ccm. of xylene while extracting the water by centrifuging until an acid number of 39 mg. KOH/g. of polyester solution is reached, the solvent is extracted at 160° C. at a pressure of 100 mm. Hg. 0.015% of hydroquinone is added as stabiliser and the polyester is diluted with 208 g. of styrene at 120° C. while stirring vigorously. The polyester solution cooled to room temperature is cured with addition of 1.6% of methyl-ethylketone hydroperoxide in methyl-ethylketone and 0.4% of cobalt naphthenate in styrene to form a film, which is dust-dry after 20 minutes and can be buffed and polished after 5 hours.

Example 2

196 g. of maleic acid anhydride, 198 g. of glycerine mono-(endomethylene-tetrahydrobenzyl)-ether (obtainable by reacting cyclopentadiene with glycerine monoallyl ether), 62 g. of ethylene glycol and 200 ccm. of xylene are esterified azeotropically as indicated in Example 1 to an acid number of 40 mg. KOH/g. of polyester solution, the xylene is removed in vacuo. 0.015% of hydroquinone is added and the substance diluted with 208 g. of styrene. The film cured adding catalyst and accelerator could be buffed and polished after 4 hours.

Example 3

196 g. of maleic anhydride, 83 g. of ethylene glycol and 214 g. of the adduct of cyclopentadiene and pentaerythritol diallyl ether are esterified with 200 ccm. of xylene as indicated in Example 1 to an acid number of 43 mg. KOH/g. of polyester solution. 0.015% of hydroquinone is added and the mixture diluted with 208 g. of styrene at 120° C. The cured film was dust-dry after 25 minutes and could be buffed and polished after 4 hours.

What we claim is:

1. Addition polymers of a monomeric vinyl compound of the group consisting of styrene and vinyltoluene and an unsaturated linear polyester resin containing in its molecule $\alpha,\beta$-unsaturated dicarboxylic acid ester groupings and groupings of the formula

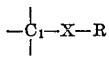

wherein $C_1$ represents a carbon atom of one of the glycol radicals of the polyester molecule, R represents a member of the group consisting of the endomethylene tetrahydrophenyl radical, the endomethylene hexahydrophenyl radical, the 1.4-methano-bicyclo-[4.3.0]-nonenyl radical and the 1.4-methano-bicyclo-[4.3.0]-nonyl radical and X represents an aliphatic radical containing in its chain 1–4 carbon atoms and 1 oxygen atom.

2. Addition polymers of styrene and an unsaturated linear polyester resin containing in its molecule $\alpha$-$\beta$-unsaturated dicarboxylic acid ester groupings and groupings of the formula

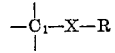

wherein $C_1$ represents a carbon atom of one of the glycol radicals of the polyester molecule, R represents a member of the group consisting of the endomethylene tetrahydrophenyl radical, the endomethylene hexahydrophenyl radical, the 1.4-methano-bicyclo-[4.3.0]-nonenyl radical and the 1.4-methano-bicyclo-[4.3.0]-nonyl radical and X represents an aliphatic radical containing in its chain 1–4 carbon atoms and 1 oxygen atom.

3. Additional polymers of styrene and an unsaturated linear polyester resin containing in its molecule maleic acid ester groupings and groupings of the formula

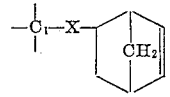

wherein $C_1$ represents a carbon atom of one of the glycol radicals of the polyester molecule and X represents an aliphatic radical containing in its chain 1–4 carbon atoms and 1 oxygen atom.

4. Addition polymers of styrene and an unsaturated linear polyester resin containing in its molecule maleic acid ester groupings and groupings of the formula

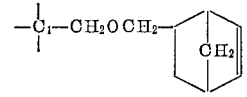

wherein $C_1$ represents a carbon atom of one of the glycol radicals of the polyester molecule.

5. Addition polymers of styrene and an unsaturated polyester resin containing in its molecule maleic acid ester groupings and groupings of the formula

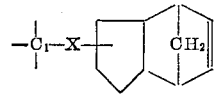

wherein $C_1$ represents a carbon atom of one of the glycol radicals of the polyester molecule and X represents an aliphatic radical containing in its chain 1–4 carbon atoms and 1 oxygen atom.

6. Addition polymers of styrene and an unsaturated linear polyester resin containing in its molecule maleic acid ester groupings and groupings of the formula

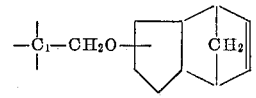

wherein $C_1$ represents a carbon atom of one of the glycol radicals of the polyester molecule.

References Cited in the file of this patent

UNITED STATES PATENTS

| | | |
|---|---|---|
| 2,421,876 | Gerhart | June 10, 1947 |
| 2,841,485 | Johnson et al. | July 1, 1958 |
| 2,863,795 | Robitschek | Dec. 9, 1958 |
| 2,951,823 | Sauer | Sept. 6, 1960 |

FOREIGN PATENTS

| | | |
|---|---|---|
| 766,666 | Great Britain | Jan. 23, 1957 |